(12) United States Patent
Dasanayake Aluthge et al.

(10) Patent No.: US 11,554,960 B2
(45) Date of Patent: Jan. 17, 2023

(54) CARBON DIOXIDE REDUCTION SYSTEM AND CARBON DIOXIDE REDUCTION METHOD

(71) Applicant: SEKISUI CHEMICAL CO., LTD., Osaka (JP)

(72) Inventors: Rasika Dasanayake Aluthge, Tokyo (JP); Kenichi Shinmei, Tsukuba (JP); Toshihito Miyama, Tsukuba (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 126 days.

(21) Appl. No.: 16/970,446

(22) PCT Filed: Feb. 22, 2019

(86) PCT No.: PCT/JP2019/006899
§ 371 (c)(1),
(2) Date: Aug. 17, 2020

(87) PCT Pub. No.: WO2019/163968
PCT Pub. Date: Aug. 29, 2019

(65) Prior Publication Data
US 2021/0009428 A1 Jan. 14, 2021

(30) Foreign Application Priority Data

Feb. 22, 2018 (JP) ............................. JP2018-029625

(51) Int. Cl.
*C01B 32/40* (2017.01)
*B01J 19/00* (2006.01)
(Continued)

(52) U.S. Cl.
CPC ............ *C01B 32/40* (2017.08); *B01J 19/0013* (2013.01); *B01J 19/2465* (2013.01); *C01B 5/00* (2013.01);
(Continued)

(58) Field of Classification Search
CPC ........ C01B 32/40; C01B 5/00; B01J 19/0013; B01J 19/2465; B01J 2219/00157; B01D 53/02; B01D 53/1475; B01D 2257/504
(Continued)

(56) References Cited

U.S. PATENT DOCUMENTS 9,364,791 B1   6/2016  Fan
2014/0364516 A1  12/2014  Kuhl
(Continued)

FOREIGN PATENT DOCUMENTS

EP   2 634 140        9/2013
EP   3395758 A1 * 10/2018 ............... C01B 3/34
(Continued)

OTHER PUBLICATIONS

Extended European Search Report dated Nov. 4, 2021 in corresponding European Patent Application No. 19757980.8, 8 pages.
(Continued)

*Primary Examiner* — Anita Nassiri-Motlagh
(74) *Attorney, Agent, or Firm* — Wenderoth, Lind & Ponack, L.L.P.

(57) ABSTRACT

A carbon dioxide reduction system 1 comprises a transport path 4 that transports carbon dioxide and a reduction apparatus 5 that reduces heated carbon dioxide introduced through the transport path 4, wherein the carbon dioxide is heated in the transport path 4 by at least one of recycled energy and exhaust heat.

9 Claims, 2 Drawing Sheets (51) Int. Cl.
    *B01J 19/24*     (2006.01)
    *B01D 53/02*     (2006.01)
    *B01D 53/14*     (2006.01)
    *C01B 5/00*     (2006.01)

(52) U.S. Cl.
    CPC .......... *B01D 53/02* (2013.01); *B01D 53/1475* (2013.01); *B01D 2257/504* (2013.01); *B01J 2219/00157* (2013.01)

(58) Field of Classification Search
    USPC ..................................................... 423/418.2
    See application file for complete search history.

(56) References Cited

U.S. PATENT DOCUMENTS

2016/0332150 A1   11/2016   Fan et al.
2017/0354958 A1   12/2017   Fan et al.

FOREIGN PATENT DOCUMENTS

| | | |
|---|---|---|
| JP | 11-21118 | 1/1999 |
| JP | 2012-101986 | 5/2012 |
| JP | 2014-167146 | 9/2014 |
| JP | 2015-505292 | 2/2015 |
| JP | 2015-77120 | 4/2015 |
| WO | 2012/017916 | 2/2012 |
| WO | 2012/063697 | 5/2012 |
| WO | 2017/111415 | 6/2017 |

OTHER PUBLICATIONS

International SearchReport (ISR) dated May 21, 2019 in International (PCT) Application No. PCT/JP2019/006899.

Galvita et al., "$CeO_2$-Modified $Fe_2O_3$ for $CO_2$ Utilization via Chemical Looping", Industrial & Engineering Chemistry Research, 2013, vol. 52, pp. 8416-8426, 11 pages.

\* cited by examiner

CARBON DIOXIDE REDUCTION SYSTEM AND CARBON DIOXIDE REDUCTION METHOD

TECHNICAL FIELD

The present invention relates to a carbon dioxide reduction system for reducing carbon dioxide, and a carbon dioxide reduction method.

BACKGROUND ART

Conventionally, from power generation facilities, iron manufacturing facilities, etc., enormous amounts of exhaust gas containing carbon dioxide are exhausted due to use of fossil fuels such as petroleum and coal. Also, from incinerators, enormous amounts of exhaust gas containing carbon dioxide are exhausted due to incineration of combustibles such as waste material. In recent years, suppression of carbon dioxide emission has become increasingly important to prevent global warming and construct a sustainable society, so that attempts at effectively using exhaust gas containing carbon dioxide have been made.

For example, PTL1 discloses that at least a part of carbon dioxide and hydrogen in an exhaust gas is reformed to carbon monoxide and water vapor by a reverse shift reaction, and the reformed gas is then subjected to microbial fermentation to produce organic materials.

CITATION LIST

Patent Literature

PTL1: JP 2015-77120 A

SUMMARY OF INVENTION

Technical Problem

Carbon dioxide has low thermal energy, so that reduction to a useful material such as carbon monoxide requires heating. Heating of carbon dioxide usually generates carbon dioxide, so that the reduction of carbon dioxide to a useful material hardly contributes to elimination of carbon dioxide.

Accordingly, a problem of the present invention is to provide a carbon dioxide reduction system and a carbon dioxide reduction method capable of contributing to elimination of carbon dioxide.

Solution to Problem

Through extensive study on the problem, the present inventors have found that heating carbon dioxide by recycled energy or exhaust heat contributes to elimination of carbon dioxide, so that the following present invention has been accomplished. The summary of the present invention is shown in the following items [1] to [12].

[1] A carbon dioxide reduction system comprising a reduction apparatus that reduces carbon dioxide and a transport path that transports carbon dioxide to the reduction apparatus, wherein the carbon dioxide is heated in the transport path by at least one of recycled energy and exhaust heat.

[2] The carbon dioxide reduction system according to the item [1], wherein the recycled energy is produced by at least one selected from the group consisting of solar power generation, wind power generation, hydraulic power generation, wave power generation, tidal power generation, biomass power generation, geothermal power generation, solar heat, and underground heat.

[3] The carbon dioxide reduction system according to the item [1] or [2], wherein the exhaust heat is heat generated in a combustion furnace.

[4] The carbon dioxide reduction system according to any one of the items [1] to [3] further comprising a carbon dioxide separation apparatus, wherein the carbon dioxide in the transport path is carbon dioxide separated from an exhaust gas containing carbon dioxide by the carbon dioxide separation apparatus.

[5] The carbon dioxide reduction system according to the item [4], further comprising a combustion furnace, wherein the exhaust gas is exhaust gas generated in the combustion furnace, and the transport path is a circulation path that circulates carbon dioxide so that the carbon dioxide is heated by the heat generated in the combustion furnace.

[6] The carbon dioxide reduction system according to the item [5], further comprising a heat exchanger that cools the exhaust gas containing carbon dioxide generated in the combustion furnace, wherein the circulation path sends the carbon dioxide to the heat exchanger, and the carbon dioxide is heated by heat exchange with the exhaust gas in the heat exchanger.

[7] The carbon dioxide reduction system according to the item [6], wherein the combustion furnace comprises a combustion chamber in which combustibles are burned and an exhaust gas path connecting to the combustion chamber, and the heat exchanger is attached to the exhaust gas path.

[8] The carbon dioxide reduction system according to any one of the items [1] to [7], wherein the reduction apparatus reduces carbon dioxide to carbon monoxide.

[9] The carbon dioxide reduction system according to any one of the items [1] to [8], wherein the reduction apparatus is a reverse shift reaction apparatus that produces carbon monoxide and water from carbon dioxide and hydrogen by a reverse shift reaction.

[10] The carbon dioxide reduction system according to any one of the items [1] to [9], wherein the reduction apparatus is a chemical looping reaction apparatus.

[11] A carbon dioxide reduction method comprising a step of heating carbon dioxide by at least one of recycled energy and exhaust heat, and a step of reducing the heated carbon dioxide.

[12] The carbon dioxide reduction method according to the item [11], further comprising a step of separating carbon dioxide from an exhaust gas containing carbon dioxide.

The present invention further provides the following items [13] to [19].

[13] A carbon dioxide reduction system comprising a combustion furnace, a carbon dioxide separation apparatus that separates carbon dioxide from an exhaust gas containing carbon dioxide generated in the combustion furnace, a circulation path that circulates the carbon dioxide separated by the carbon dioxide separation apparatus so that the carbon dioxide is heated by heat generated in the combustion furnace, and a reduction apparatus that reduces the heated carbon dioxide.

[14] The carbon dioxide reduction system according to the item [13], wherein the reduction apparatus reduces carbon dioxide to carbon monoxide.

[15] The carbon dioxide reduction system according to the item [13] or [14], wherein the reduction apparatus is a reverse shift reaction apparatus that generates carbon monoxide and water from carbon dioxide and hydrogen by a reverse shift reaction.

[16] The carbon dioxide reduction system according to any one of the items [13] to [15], wherein the reduction apparatus is a chemical looping-type reaction apparatus.

[17] The carbon dioxide reduction system according to any one of the items [13] to [16], further comprising a heat exchanger that cools an exhaust gas containing carbon dioxide generated in the combustion furnace, wherein the circulation path sends the carbon dioxide separated by the carbon dioxide separation apparatus to the heat exchanger and the carbon dioxide is heated by heat exchange with the exhaust gas in the heat exchanger.

[18] The carbon dioxide reduction system according to the item [17], wherein the combustion furnace comprises a combustion chamber that combustibles are burned and an exhaust gas path connecting to the combustion chamber, and the heat exchanger is attached to the exhaust gas path.

[19] A carbon dioxide reduction method comprising a step of separating carbon dioxide from an exhaust gas containing carbon dioxide generated in a combustion furnace, a step of heating the carbon dioxide by heat generated in the incinerator, and a step of reducing the heated carbon dioxide.

Advantageous Effects of Invention

The present invention can contribute to elimination of carbon dioxide.

DESCRIPTION OF EMBODIMENTS

Figure 1:
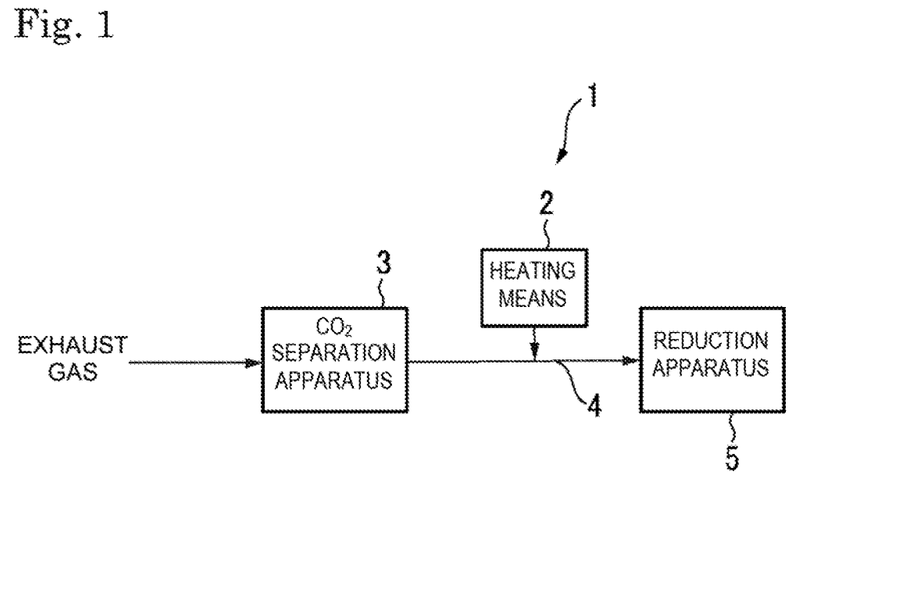
FIG. 1 is a schematic view showing the carbon dioxide reduction system of the present invention.

In the following, the carbon dioxide reduction system and the carbon dioxide reduction method of the present invention is described with reference to drawings. As shown in FIG. 1, a carbon dioxide reduction system 1 of the present invention comprises a transport path 4 and a reduction apparatus 5.

In a preferred embodiment, the carbon dioxide reduction system 1 of the present invention further comprises a carbon dioxide separation apparatus 3. In general, it cannot be said that an exhaust gas containing carbon dioxide has a sufficiently high carbon dioxide content, and it cannot be said that the direct use thereof efficiently produces a usable material. However, by separating carbon dioxide contained in an exhaust gas by the carbon dioxide separation apparatus 3, then heating the carbon dioxide, and reducing the heated carbon dioxide, the carbon dioxide contained in the exhaust gas can be efficiently reduced.

In the following, a preferred embodiment is described in detail.

The carbon dioxide ($CO_2$) separation apparatus 3 is an apparatus that separates carbon dioxide from an exhaust gas containing carbon dioxide. The apparatus for separating carbon dioxide is not particularly limited, and examples of the separation type include chemical absorption, absorption by solid, and membrane separation, of which details are described in the following embodiment. The exhaust gas containing carbon dioxide is not particularly limited, and examples thereof include an exhaust gas emitted from a combustion furnace, an exhaust gas emitted from a cement plant, an exhaust gas emitted from a power generation station (thermal power), an exhaust gas emitted from an ironworks, and an exhaust gas emitted from an oil refinery.

The transport path 4 is a path that transports carbon dioxide separated in the carbon dioxide separation apparatus 3 to the reduction apparatus 5. The separated carbon dioxide is heated by heating means 2 in the transport path 4. Heating of carbon dioxide in the transport path 4 enables the heated carbon dioxide to be introduced into the reduction apparatus 5 with a small amount of heat radiation loss.

Although the transport path 4 is not particularly limited so long as the path connects the carbon dioxide separation apparatus 3 to the reduction apparatus 5, a path may be made of pipe, tube, etc. The pipe may be in any form, and, for example, in a plate form. Also, the transport path 4 may include a vessel, a tank, etc., in the middle of the path, and, for example, the separated carbon dioxide may be heated by the heating means 2 in the vessel, the tank, etc. The separated carbon dioxide may be once stagnated, for example, in the vessel, the tank, etc.

In addition, it is preferable that the transport path 4 be a circulation path as shown in the following embodiment. The circulation path is a path that circulates the carbon dioxide separated in the carbon dioxide separation apparatus 3 so that the carbon dioxide is heated by heat generated in a combustion furnace or the like that is a generation source of the exhaust gas.

The heating means 2 heats the separated carbon dioxide by at least one of recycled energy and exhaust heat. The recycled energy harnesses at least one selected from solar power generation, wind power generation, hydraulic power generation, wave power generation, tidal power generation, biomass power generation, geothermal power generation, solar heat, and underground heat. Also, examples of the exhaust heat include heat generated in the reduction apparatus and heat generated in an apparatus other than the reduction apparatus. Examples of the heat generated in an apparatus other than the reduction apparatus include heat generated in a combustion furnace, heat generated in a cement plant, heat generated in a power station (thermal power), heat generated in an ironworks, and heat generated in an oil refinery. One of these may be used alone, or two or more thereof may be used in combination.

Although the heating means 2 is not particularly limited so long as the separated carbon dioxide can be heated in the transport path 4, the heating means is preferably composed of a heat exchanger. The heat exchanger heats carbon dioxide through heat exchange, for example, between a heating medium heated by at least one of the recycled energy and the exhaust heat, and carbon dioxide transported in the transport path 4. Examples of the heating medium include a fluid such as liquid or gas.

The heat exchanger is not particularly limited, and examples thereof include one in which a tube, a pipe, etc., as a part of the transport path 4 is in contact with the heating medium, one in which the tube, the pipe, etc., is attached to the outer peripheral surface of a structure having an inner part through which a heated medium passes, and one in which the tube, the pipe, etc., is arranged in the heating medium.

The heating means 2 may be heat rays from a recycled energy, exhaust heat, etc., which may be applied, for example, to the outer peripheral surface of the pipe, the tube, the vessel, the tank, etc., constituting the transport path 4. Alternatively, the sunlight may be directly applied to the outer peripheral surface of the pipe, the tube, the vessel, the tank, etc. The heating means 2 may be a heater heated by various types of power generation, and the heater may be arranged in the inner part of the tube, the pipe and the tank constituting the transport path 4, or heating may be performed by a heater from outside thereof. Alternatively, for example, at least a part of the transport path 4 such as the pipe and the tube may be embedded in the ground so as to be heated by underground heat.

The reduction apparatus 5 reduces carbon dioxide introduced from the transport path 4 and heated by the heating means 2. The reduction apparatus is not particularly limited so long as carbon dioxide can be reduced, preferably being a reverse shift reaction apparatus as described below, a methanation apparatus, a methanol synthesis apparatus, an ethanol production apparatus, or an acrylic acid synthesis apparatus, more preferably a reverse shift reaction apparatus, still more preferably a chemical looping reaction apparatus. The details of the reduction apparatus 5, the details of reduction of carbon dioxide performed in the reduction apparatus 5, and the materials to be produced are described as follows.

As described above, in the present invention, carbon dioxide is heated by recycled energy or an exhaust heat, so that no carbon dioxide is additionally emitted for heating of carbon dioxide. Accordingly, the present invention sufficiently contributes to elimination of carbon dioxide.

In the following, the present invention is described in more details with reference to an embodiment. In the carbon dioxide reduction system and the carbon dioxide reduction method in the present embodiment described below, the exhaust gas supplied to a carbon dioxide separation apparatus is an exhaust gas generated in a combustion furnace, and the carbon dioxide is heated by the heat (exhaust heat) generated in the combustion furnace. Accordingly, the carbon dioxide reduction method in an embodiment described below includes a heat recovery process for recovering exhaust heat using carbon dioxide.

Figure 2:
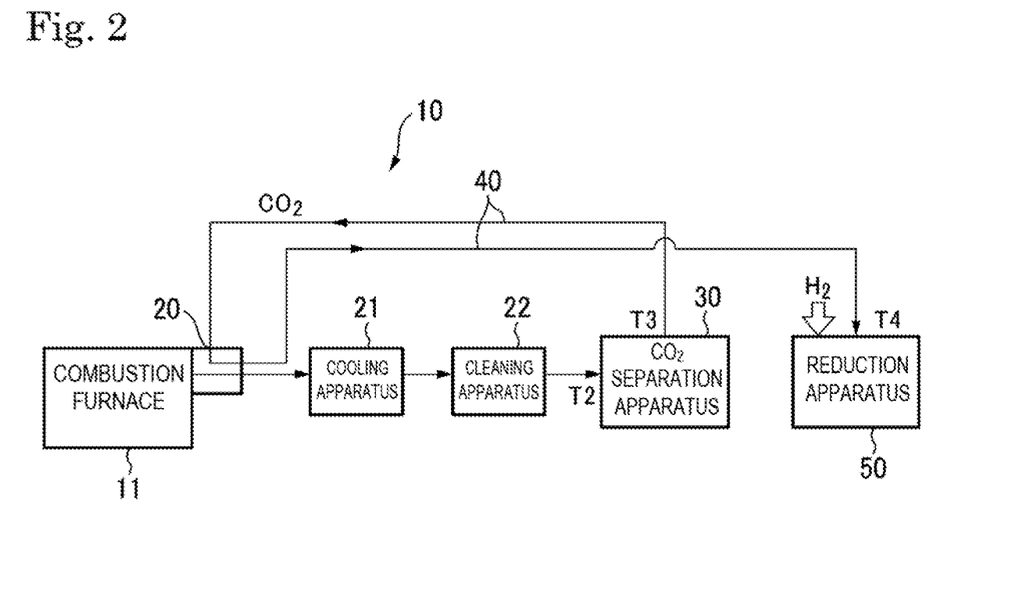
FIG. 2 is a schematic diagram showing an embodiment of the carbon dioxide reduction system of the present invention.

FIG. 2 shows a carbon dioxide reduction system 10 in an embodiment of the present invention.

The carbon dioxide reduction system 10 comprises a combustion furnace 11, a heat exchanger 20, a carbon dioxide ($CO_2$) separation apparatus 30, a circulation path 40, and a reduction apparatus 50.

(Combustion Furnace)

Examples of the combustion furnace 11 in the carbon dioxide reduction system 10 include an incinerator that incinerates waste materials. The type of the incinerator is not particularly limited, and known ones such as a stoker type incinerator, a fluidized bed-type incinerator, a kiln-type incinerator, and a gasification melting furnace are used. The incinerator may include a combination of two or more of these types. Among these, a stoker type incinerator is particularly preferred as the combustion furnace 11. The combustion furnace 11 is not limited to ones that incinerates waste materials, and may be ones in which the exhaust gas generated by combustion of combustibles contains carbon dioxide, such as a blast furnace which burns coke or the like other than waste materials. As the combustion furnace 11, an incinerator that incinerates waste materials is preferred.

Figure 3:
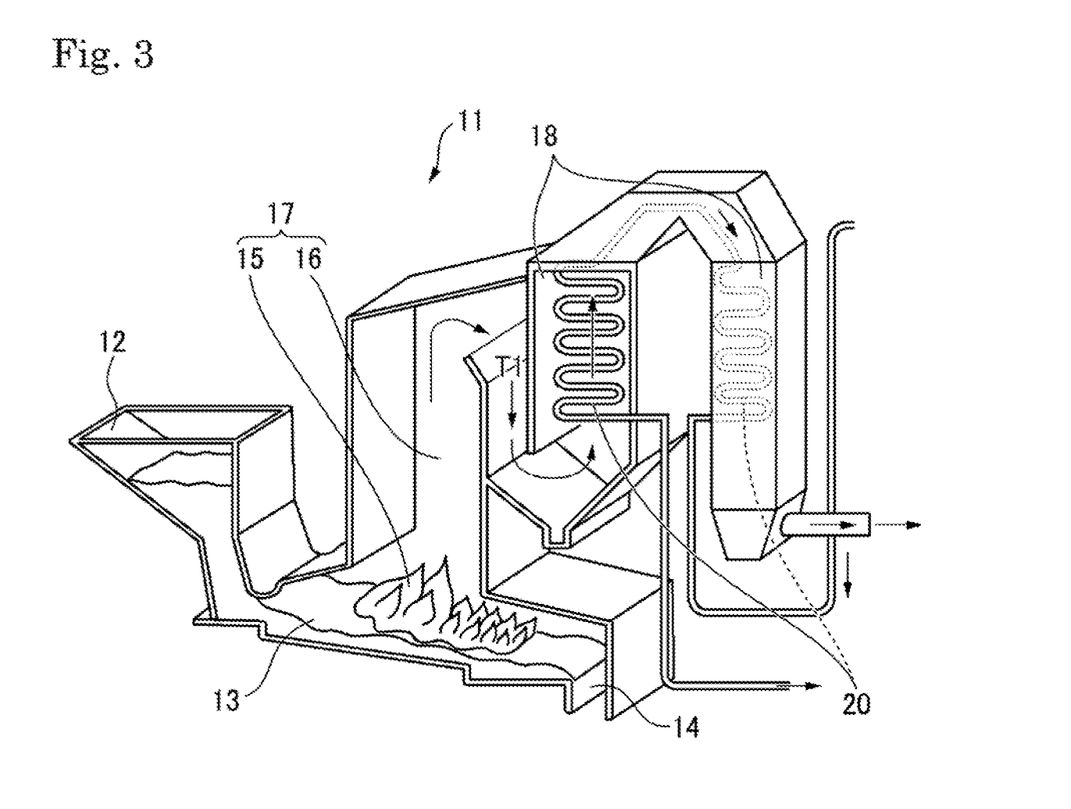
FIG. 3 is a schematic diagram showing an example of the combustion furnace for use in the carbon dioxide reduction system of the present invention.

FIG. 3 is a schematic view of the combustion furnace 11 which is a stoker type incinerator. As shown in FIG. 3, the stoker type incinerator includes an introduction port 12 through which combustibles such as waste materials are introduced, a stoker 13 on which the combustibles are burned, and an ash discharge port 14 through which incineration ash produced by combustion in the stoker 13 is discharged.

In general, the stoker 13 is in a stepwise form or in an inclined form, and the combustibles placed to an upper stage of the stoker 13 from the introduction port 12 is dried on the upper stage of the stoker 13, and then sent to the middle stage, such that the combustibles are burned in the middle stage. Subsequently, the burned combustibles are sent to the rear stage and subjected to post combustion in the rear stage to make an incineration ash, which is discharged from the ash discharge port 14. In order to burn the combustibles in the stoker 13, oxygen, air, etc., are sent from, for example, underneath of the stoker 13.

In the combustion furnace 11, a combustion chamber 17 in which combustibles are burned is composed of a lower combustion chamber 15 where a stoker is disposed, and a gas combustion chamber 16 connected to the upper part of the lower combustion chamber 15. The gas generated by combustion in the stoker 13 is subjected to further combustion in the gas combustion chamber 16. The gas subjected to further combustion in the gas combustion chamber 16 is emitted as exhaust gas outside the combustion furnace 11 through an exhaust gas path 18 connected to the gas combustion chamber 16 (i.e., combustion chamber 17), and sent to a carbon dioxide separation apparatus 30 as described below.

The exhaust gas contains carbon dioxide generated by combustion of the combustibles. Alternatively, depending on the fuel type of the combustion furnace 11, the exhaust gas may be a synthesis gas containing carbon dioxide, carbon monoxide and hydrogen, for example. Furthermore, in general, the exhaust gas may contain nitrogen, oxygen and water (water vapor) other than carbon dioxide, and may further contain carbon monoxide and hydrogen in addition thereto.

The exhaust gas may contain, for example, 2 to 30 mass % of carbon dioxide, 15 to 45% of carbon monoxide, 10 to 50% of hydrogen, 25 to 67 mass % of nitrogen, 0.5 to 20 mass % of oxygen, and 5 to 40 mass % of water. Alternatively, the exhaust gas may contain, for example, 2.5 to 25 mass % of carbon dioxide, 35 to 70 mass % of nitrogen, 4 to 18 mass % of oxygen, and 10 to 35 mass % of water.

The temperature T1 of the exhaust gas sent to the exhaust gas path 18 from the combustion chamber 17 is high, because the gas is in the immediate aftermath of combustion. Specifically, the temperature is, for example, 200 to 1300° C., preferably 300 to 900° C.

In the above case, the combustion chamber 17 including the lower combustion chamber 15 and the gas combustion chamber 16 is shown, but the lower combustion chamber 15 may be directly connected to the exhaust gas path 18 without the gas incineration chamber 16. Although the case where the combustion furnace is a stoker type incinerator has been described as an example, the combustion furnace may be any type, and a known combustion furnace having a combustion chamber and an exhaust gas path may be appropriately used.

(Heat Exchanger)

The carbon dioxide reduction system 10 has the heat exchanger 20 as described above. In the present embodiment, the heat exchanger 20 is attached to the exhaust gas path 18. The heat exchanger 20 cools the exhaust gas sent from the combustion chamber 17 and present in the inner part of the exhaust gas path 18.

As described below, the medium passing through the inner part of the heat exchanger 20 is carbon dioxide separated by the carbon dioxide separation apparatus 30. The carbon dioxide in the inner part of the heat exchanger 20 is heated by heat exchange with exhaust gas at high temperature sent from the combustion chamber 17 and present in the inner part of the exhaust gas path 18.

The heat exchanger 20 may be in any form, and may be either a tube type or a plate type, or a combination thereof. The tube type may have, for example, a heat transfer tube wound in a coil form or in a condenser form, or a bundle of a plurality of tubes. Although the heat exchanger 20 may be arranged in the inner part of the exhaust gas path 18 as shown in FIG. 3 or along the outer peripheral surface of the exhaust gas path 18, arrangement in the inner part of the exhaust gas path 18 is preferred.

Also, in the inner part of the exhaust gas path 18, a heat exchanger (not shown in drawing) other than the heat exchanger 20 may be arranged, so that the exhaust gas in the inner part of the exhaust gas path 18 can be cooled by the heat exchanger additionally. Such a heat exchanger may constitute, for example, a part of a boiler, so that a medium in the inner part of the heat exchanger heated by the exhaust gas may be used to drive the boiler.

The exhaust gas cooled by the heat exchanger 20 is emitted outside the combustion furnace 11 through the exhaust gas path 18 and sent to the carbon dioxide separation apparatus 30 as shown in FIG. 2. On this occasion, although the exhaust gas may be sent directly to the carbon dioxide separation apparatus 30, sending to the carbon dioxide separation apparatus 30 after various treatments is preferred.

For example, as shown in FIG. 2, a cooling apparatus 21 may be installed on the path between the exhaust gas path 18 and the carbon dioxide separation apparatus 30, so that the exhaust gas cooled by the heat exchanger 20 can be further cooled by the cooling apparatus 21 and then sent to the carbon dioxide separation apparatus 30. The cooling apparatus 21 is not particularly limited, and examples thereof include a heat exchanger, a cooling tower, and the like. The cooling tower for use may be a one generally used for an incinerator, such as a water spray type and an air-cooled type.

Also, on the path between the exhaust gas path 18 and the carbon dioxide separation apparatus 30, a cleaning apparatus 22 may be arranged, so that the exhaust gas cooled by the heat exchanger 20 can be cleaned by the cleaning apparatus 22 and then sent to the carbon dioxide separation apparatus 30. Examples of the cleaning apparatus 22 include a soot-dust removal apparatus such as a bag filter, various adsorption filters such as an activated carbon filter, a nitrogen oxide removal apparatus such as a denitrification reaction tower, and an acid gas removal apparatus, and soot dust, dioxin, hydrogen chloride, sulfur oxide, nitrogen oxide, organic substances, etc., are removed by these cleaning apparatuses.

In the carbon dioxide reduction system 10, any one of the cooling apparatus 21 and the cleaning apparatus 22 may be arranged, both of them may be arranged, or none of them may be arranged. Alternatively, a processing apparatus other than the cooling apparatus 21 and the cleaning apparatus 22 may be arranged. As for the cooling apparatus 21 and/or the cleaning apparatus 22, a single unit or a plurality of units may be arranged.

The exhaust gas to be sent to the carbon dioxide separation apparatus 30 is cooled by the heat exchanger 20 as described above, and further cooled by the cooling apparatus 21 on as needed basis as described above, so that the temperature of the exhaust gas decreases. However, depending on the type of the carbon dioxide separation apparatus 30, for example, in the case of the carbon dioxide separation apparatus 30 having heat resistance, the exhaust gas may be sent to the carbon dioxide separation apparatus 30 without undergoing cooling by the cooling apparatus 21. Alternatively, the exhaust gas may be sent to the carbon dioxide separation apparatus 30 without undergoing cooling by the heat exchanger 20 as described below, or without undergoing cooling by any one of the heat exchanger 20 and the cooling apparatus 21.

The temperature T2 of the exhaust gas sent to the carbon dioxide separation apparatus 30 is, for example, preferably 0 to 500° C., more preferably 5 to 450° C. With a temperature T2 in the range, carbon dioxide can be appropriately separated from the exhaust gas without placing a load on the carbon dioxide separation apparatus 30.

Furthermore, pressure may be applied to the exhaust gas emitted through the exhaust gas path 18 by a blower or the like (not shown in drawing), so that the exhaust gas in a pressurized state can be sent to the carbon dioxide separation apparatus 30.

(Carbon Dioxide Separation Apparatus)

The carbon dioxide separation apparatus 30 separates carbon dioxide from the exhaust gas sent from the fuel furnace 11. The separation type of the carbon dioxide separation apparatus 30 is not particularly limited, and examples thereof include a chemical absorption, absorption by solid, and membrane separation. Examples of the apparatus for use in chemical absorption include an apparatus that absorbs carbon dioxide in an exhaust gas into a solution of amine or the like to achieve separation, and an apparatus utilizing pressure swing adsorption (PSA). Examples of the apparatus for use in absorption by solid include a solid absorber capable of absorbing carbon dioxide, supported on a porous support. Alternatively, an apparatus using thermal swing adsorption (TSA) may be employed. Examples of the apparatus for use in membrane separation include a carbon dioxide separation membrane. Examples of the carbon dioxide separation membrane include a PBI (polybenzimidazole) typed separation membrane. The PBI typed separation membrane has heat resistance, capable of separating carbon dioxide even from an exhaust gas having relatively high temperature. Among them, use of the carbon dioxide separation membrane is preferred.

In the present invention, the separation of carbon dioxide in the carbon dioxide separation apparatus 30 requires no strict isolation of carbon dioxide from the exhaust gas, so long as separation into a gas with an increased content of carbon dioxide and another gas is achieved. The carbon dioxide content in the gas with an increased content of carbon dioxide is preferably 30 to 100 mass %, more preferably 55 to 99 mass %. In the present specification, the gas with an increased content of carbon dioxide is simply described as the separated carbon dioxide to simplify the description.

The separated carbon dioxide is sent to the heat exchanger 20 through the circulation path 40 so as to be used as a medium passing through the inner part of the heat exchanger 20. On this occasion, the temperature T3 of the separated carbon dioxide is, for example, 0 to 550° C., preferably 5 to 450° C. Accordingly, the separated carbon dioxide undergoes heat exchange with the exhaust gas generated in the inner part of the combustion furnace 11 so as to be heated in the inner part of the heat exchanger 20. The thermal energy generated by the combustion in the inner part of the combustion furnace 11 is thereby efficiently used.

The carbon dioxide heated in the heat exchanger 20 is sent to the reduction apparatus 50 through the circulation path 40. On the other hand, the exhaust gas generated in the combustion furnace 11 is cooled by the carbon dioxide passing through the inner part of the heat exchanger 20 and emitted outside the combustion furnace 11 as described above so as to be sent to the carbon dioxide separation apparatus 30.

The carbon dioxide separated in the carbon dioxide separation apparatus 30 may be sent to the reduction apparatus 50 through the circulation path 40, with a pressure being applied to the carbon dioxide, for example, by a blower or the like. On this occasion, the pressure of the inner part of the circulation path 40 is, for example, preferably 101.35 to 999 kPa, more preferably 101.50 to 500 kPa. With a pressure applied to the carbon dioxide passing through the circulation path 40, heat exchange is efficiently performed in the heat exchanger 20.

The carbon dioxide separated in the carbon dioxide separation apparatus 30 may be circulated to pass through the inner part of the heat exchanger 20, but may be circulated to also pass through, for example, the inner part of a heat exchanger for use in the cooling apparatus 21 described above. In other words, the separated carbon dioxide may pass through the inner part of the heat exchanger of the cooling apparatus 21 and the inner part of the heat exchanger 20 in this order so as to be sent to the reduction apparatus 50. In such an mode, the separated carbon dioxide is more efficiently heated by the thermal energy generated in the combustion furnace 11.

(Reduction Apparatus)

As described above, the carbon dioxide heated by the heat exchanger 20 or the other is supplied to the reduction apparatus 50. On this occasion, the temperature T4 of the carbon dioxide supplied to the reduction apparatus 50 is preferably 200 to 900° C., more preferably 300 to 700° C. With a temperature T4 of carbon dioxide in the range, additional heating in the reduction apparatus 50 can be decreased, or carbon dioxide can be reduced without heating.

In the reduction apparatus 50, the supplied carbon dioxide is reduced. On this occasion, the material obtained by the reduction of carbon dioxide may be carbon monoxide, or an organic material such as methane, methanol, acetic acid, ethane and ethylene, and carbon monoxide is preferred. The reduction apparatus 50 may perform reduction by an endothermic reaction, being preferably a reverse shift reaction apparatus that causes a reverse shift reaction, more preferably a chemical looping reaction apparatus.

Also, in order to obtain the materials described above by reduction of carbon dioxide, it is preferable that a gas component other than carbon dioxide be supplied to the reduction apparatus 50, and specifically, it is preferable that a hydrogen gas be supplied as shown in FIG. 2. By supply of the hydrogen gas, carbon monoxide and water are produced from carbon dioxide and hydrogen through a reverse shift reaction represented by the following formula (1).

$$CO_2 + H_2 \rightarrow CO + H_2O \quad (1)$$

It is preferable that the hydrogen supplied to the reduction apparatus 50 be heated. Specifically, it is preferable that the supplied hydrogen be heated to, for example, 200° C. or more, and in the case of the following one-pot reaction, heated to, for example, 300 to 900° C. or more, more preferably 350 to 750° C. Also, in the chemical looping reaction, 200 to 700° C. is preferred, and 200 to 650° C. is more preferred.

The heating method of hydrogen is not particularly limited, and heating may be performed by passing hydrogen as medium through the inner part of the heat exchanger attached to the combustion furnace (exhaust gas path) or the inner part of the heat exchanger of the cooling apparatus 21, similarly to the case of carbon dioxide, or may be performed by another method.

The reverse shift reaction apparatus is, for example, a reaction vessel with the inner part filled with a reverse shift reaction catalyst for accelerating the reaction (1), allowing both of reduction of carbon dioxide and oxidation of hydrogen to be performed in the inner part of the same reaction vessel. The reverse shift reaction including both of reduction of carbon dioxide and oxidation of hydrogen in the inner part of the same reaction vessel is referred to as one-pot reaction in the present specification.

In the one-pot reaction, carbon dioxide and hydrogen pass through the inner part of the same reaction vessel, so that carbon monoxide and water (water vapor) are produced in the inner part of the same reaction vessel, and carbon monoxide and water (water vapor) are emitted from the reaction vessel.

In the one-pot reaction, the gas temperature in the inner part of the reaction vessel is, for example, 300 to 1000° C., preferably 450 to 850° C. As described above, the carbon dioxide or the carbon dioxide and hydrogen supplied to the reduction apparatus 50 are heated in advance. Accordingly, the reaction vessel may not be heated, or may be heated in the case where the gas temperature does not reach the temperature.

Examples of the reverse shift reaction catalyst for use in the one-pot reaction described above include one containing a noble metal catalyst such as ruthenium (Ru) and rhodium (Ru), and one containing a metal catalyst such as Mn, Fe and Co.

Examples of the reverse shift reaction in a more preferred mode include the chemical looping reaction. The reaction apparatus for use in the chemical looping reaction (chemical looping reaction apparatus) has a first reaction vessel and a second reaction vessel, and the reaction represented by the formula (1) is performed as separate first and second reactions in the first and second reaction vessels, respectively. Specifically, each of the first and second reaction vessels is filled with a metal oxide catalyst so as to perform the first reaction for reducing carbon dioxide to carbon monoxide in one reaction vessel and the second reaction for oxidizing hydrogen to water in another reaction vessel. The first and second reactions are represented by the following formulas (2) and (3), respectively.

By supplying carbon dioxide to one of the reaction vessels and hydrogen to the other, the first and second reactions are respectively performed, so that a gas containing carbon monoxide is emitted from the one and a gas containing water (water vapor) is emitted from the other.

$$CO_2(gas) + MO_{x-1}(solid) \rightarrow CO(gas) + MO_x(solid) \quad (2)$$

$$H_2(gas) + MO_x(solid) \rightarrow H_2O(gas) + MO_{x-1}(solid) \quad (3)$$

wherein M represents a metal and x represents a positive integer.

Examples of the chemical looping reaction apparatus include one having a catalyst circulation path that circulates a metal oxide catalyst between two reaction vessels. In this chemical looping reaction apparatus, carbon dioxide is supplied to the first reaction vessel to perform a reduction reaction and emit carbon monoxide therefrom, and hydrogen is supplied to the second reaction vessel to perform an oxidation reaction and emit water therefrom. In addition, the metal oxide catalyst oxidized in the first reaction vessel is sent to the second reaction vessel, and the metal oxide catalyst reduced in the second reaction vessel is sent to the first reaction vessel, so that the metal oxide catalyst is circulated. The circulation of the metal oxide catalyst enables the metal oxide catalyst to be used for a long period without deactivation even when subjected to repetitions of reduction and oxidation in the first and second reaction vessels, respectively.

The chemical looping reaction apparatus may be a type which fixes a catalyst and switches the gas supplied to each of the reaction vessels. This type of the chemical looping reaction apparatus has a first and a second reaction vessels filled with metal oxide catalysts, respectively, and lines for supplying carbon dioxide and hydrogen are attached to both of the first and second reaction vessels. Carbon dioxide is supplied to one of the reaction vessels to perform the reduction reaction in the reaction vessel and emit carbon monoxide, while hydrogen is supplied to the other reaction vessel to perform the oxidation reaction in the reaction vessel and emit water.

The reaction vessel to which carbon dioxide is supplied and the reaction vessel to which hydrogen is supplied are appropriately switched as time proceeds, so that oxidation and reduction of the metal oxide catalyst are repeated in each of the reaction vessels, allowing the metal oxide catalyst to be used for a long period without deactivation.

In the chemical looping reaction apparatus, the gas temperature in the first reaction vessel (i.e., the reaction vessel in which reduction of carbon dioxide is performed) is, for example, 450 to 1000° C., preferably 500 to 850° C. In addition, the gas temperature in the second reaction vessel (i.e., the reaction vessel in which oxidation of hydrogen is performed) is, for example, 300 to 800° C., preferably 300 to 750° C.

The first and second reaction vessels may not be heated, or may be heated in the case where the gas temperature of carbon dioxide and hydrogen supplied to these vessels does not reach the temperatures.

As the metal oxide catalyst in the chemical looping reaction apparatus, a known metal oxide catalyst may be used, and examples thereof include one or two or more of oxides of metal selected from La, Sr, Co, Ce, Zr, Y and Fe. Examples of the oxide may include an oxide having a perovskite crystal structure.

Carbon monoxide obtained in the reduction apparatus 50 may be converted into an organic substance by microbial fermentation or the like. Also, water obtained in the reduction apparatus 50 may be appropriately removed by liquefaction or the like.

As described above, according to the present embodiment, the carbon dioxide separated by a carbon dioxide separation apparatus is heated by using thermal energy generated in a combustion furnace and then reduced, so that the carbon dioxide contained in the exhaust gas generated in the combustion furnace can be efficiently reduced. Also, in the present embodiment, by using carbon dioxide, which has a large heat capacity and is inactive, as heat recovery medium, the heat generated in a combustion furnace can be safely and efficiently recovered.

Although a heat exchanger that cools the exhaust gas containing carbon dioxide generated in a combustion furnace is provided in the embodiment described above, the heat exchanger may not be provided and the exhaust gas containing carbon dioxide generated in a combustion furnace may be sent to a carbon dioxide separation apparatus without cooling by a heat exchanger.

However, in this case also, as the separated carbon dioxide needs to be heated by the heat generated in the combustion furnace, the carbon dioxide may be heated by, for example, passing the carbon dioxide separated by the carbon dioxide separation apparatus through a pipe that is inserted in the combustion chamber.

REFERENCE SIGNS LIST

1: CARBON DIOXIDE REDUCTION SYSTEM
2: HEATING MEANS
3: CARBON DIOXIDE SEPARATION APPARATUS
4: TRANSPORT PATH
5: REDUCTION APPARATUS
10: CARBON DIOXIDE REDUCTION SYSTEM
11: COMBUSTION FURNACE
12: INTRODUCTION PORT
13: STOKER
14: ASH DISCHARGE PORT
15: LOWER COMBUSTION CHAMBER
16: GAS COMBUSTION CHAMBER
17: COMBUSTION CHAMBER
18: EXHAUST GAS PATH
20: HEAT EXCHANGER
21: COOLING APPARATUS
22: CLEANING APPARATUS
30: CARBON DIOXIDE SEPARATION APPARATUS
40: CIRCULATION PATH
50: REDUCTION APPARATUS

The invention claimed is:

1. A carbon dioxide reduction system comprising:
   a reduction apparatus that reduces carbon dioxide wherein the reduction apparatus is a chemical looping reaction apparatus; and
   a transport path that transports carbon dioxide to the reduction apparatus, wherein the carbon dioxide is heated in the transport path by at least one of recycled energy and exhaust heat.

2. The carbon dioxide reduction system according to claim 1, wherein the recycled energy is produced by at least one selected from the group consisting of solar power generation, wind power generation, hydraulic power generation, wave power generation, tidal power generation, biomass power generation, geothermal power generation, solar heat, and underground heat.

3. The carbon dioxide reduction system according to claim 1, wherein the exhaust heat is heat generated in a combustion furnace.

4. The carbon dioxide reduction system according to claim 1, further comprising:
   a carbon dioxide separation apparatus, wherein the carbon dioxide in the transport path is carbon dioxide separated from an exhaust gas containing carbon dioxide by the carbon dioxide separation apparatus.

5. The carbon dioxide reduction system according to claim 4, further comprising:
   a combustion furnace, wherein the exhaust gas is exhaust gas generated in the combustion furnace, and the transport path is a circulation path that circulates the carbon dioxide so that the carbon dioxide is heated by the heat generated in the combustion furnace.

6. The carbon dioxide reduction system according to claim 5, further comprising:

a heat exchanger that cools the exhaust gas containing carbon dioxide generated in the combustion furnace, wherein the circulation path sends the carbon dioxide to the heat exchanger, and the carbon dioxide is heated by heat exchange with the exhaust gas in the heat exchanger.

7. The carbon dioxide reduction system according to claim 6, wherein the combustion furnace comprises a combustion chamber in which combustibles are burned and an exhaust gas path that connects to the combustion chamber, and the heat exchanger is attached to the exhaust gas path.

8. The carbon dioxide reduction system according to claim 1, wherein the reduction apparatus reduces carbon dioxide to carbon monoxide.

9. The carbon dioxide reduction system according to claim 1, wherein the reduction apparatus is a reverse shift reaction apparatus that produces carbon monoxide and water from carbon dioxide and hydrogen by a reverse shift reaction.

* * * * *